United States Patent
Patel et al.

(10) Patent No.: US 10,286,958 B2
(45) Date of Patent: May 14, 2019

(54) VEHICLES INCLUDING MESH STAMPED PANELS

(71) Applicant: Toyota Motor Engineering & Manufacturing North America, Inc., Erlanger, KY (US)

(72) Inventors: Yogesh Patel, Georgetown, KY (US); Kirby Bryson, Lexington, KY (US); Naoshi Yamaki, Florence, KY (US); Hiroaki Oba, Union, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/649,932

(22) Filed: Jul. 14, 2017

(65) Prior Publication Data
US 2019/0016393 A1    Jan. 17, 2019

(51) Int. Cl.
| | | |
|---|---|---|
| *B62D 25/00* | (2006.01) | |
| *B62D 25/06* | (2006.01) | |
| *B32B 27/00* | (2006.01) | |
| *B62D 25/10* | (2006.01) | |
| *B62D 29/00* | (2006.01) | |

(52) U.S. Cl.
CPC ............. *B62D 25/06* (2013.01); *B32B 27/00* (2013.01); *B62D 25/105* (2013.01); *B62D 25/00* (2013.01); *B62D 29/00* (2013.01)

(58) Field of Classification Search
CPC ...... B62D 25/00; B62D 25/06; B62D 25/105; B62D 29/00; B32B 27/00
USPC .......... 296/187.03, 187.05, 187.13, 191, 210
See application file for complete search history.

(56) References Cited

U.S. PATENT DOCUMENTS

| | | | | |
|---|---|---|---|---|
| 4,348,442 A * | 9/1982 | Figge | .................. | B32B 3/30 |
| | | | | 428/72 |
| 4,495,237 A | 1/1985 | Patterson | | |
| 5,322,743 A | 6/1994 | Fujisawa et al. | | |
| 6,451,235 B1 * | 9/2002 | Owens | .................. | D21J 3/00 |
| | | | | 162/218 |
| 7,014,256 B2 * | 3/2006 | Kamura | ............... | B62D 25/20 |
| | | | | 296/1.03 |
| 8,381,471 B2 | 2/2013 | Kobre | | |
| 8,932,700 B2 | 1/2015 | Shimizu et al. | | |
| 2002/0070584 A1 * | 6/2002 | Carroll, III | ............... | B32B 3/28 |
| | | | | 296/187.03 |

(Continued)

FOREIGN PATENT DOCUMENTS

| | | |
|---|---|---|
| CN | 106356445 | 1/2017 |
| JP | 4343417 | 10/2009 |
| WO | WO2013145937 | 10/2013 |

OTHER PUBLICATIONS

"Black color pyramid sound acoustic foam acoustic panel" https://www.aliexpress.com/item/2pcs-size-200-100M-Total-4-Square-meters-Black-Color-pyramid-studio-acoustic-foam-sound-acoustic/32656873700.html?spm=2114.40010308.4.19.YFdA6b Published/Access Date: Apr. 12, 2017.

(Continued)

*Primary Examiner* — Gregory A Blankenship
(74) *Attorney, Agent, or Firm* — Dinsmore & Shohl LLP (57) ABSTRACT

A vehicle includes a vehicle panel including a plurality of individual mesh structures where the individual mesh structures each include four triangular sides extending outwardly from a plane of the panel forming a pyramid shape. A fillet connects adjacent triangular sides.

17 Claims, 6 Drawing Sheets

(56) References Cited

U.S. PATENT DOCUMENTS

| | | | |
|---|---|---|---|
| 2003/0038511 A1* | 2/2003 | Audibert | B29C 44/1209 |
| | | | 296/210 |
| 2005/0212328 A1* | 9/2005 | Ashmead | F16F 7/12 |
| | | | 296/187.05 |
| 2006/0250707 A1 | 11/2006 | Whitney et al. | |
| 2008/0122259 A1* | 5/2008 | Matsui | B62D 21/157 |
| | | | 296/187.12 |
| 2013/0183498 A1* | 7/2013 | Takahashi | B21D 13/10 |
| | | | 428/180 |
| 2015/0175210 A1* | 6/2015 | Raymond | B62D 21/10 |
| | | | 296/191 |
| 2016/0273222 A1* | 9/2016 | Yonebayashi | B62D 25/00 |
| 2017/0282978 A1* | 10/2017 | Yoshida | B62D 25/105 |
| 2018/0244314 A1* | 8/2018 | Cho | B62D 29/043 |

OTHER PUBLICATIONS

"QuadraPyramid™ sound diffuser" http://www.acousticsfirst.com/diffuser-quadrapryamid.htm Published/Access Date: Apr. 12, 2017.

\* cited by examiner

VEHICLES INCLUDING MESH STAMPED PANELS

TECHNICAL FIELD

The present specification generally relates to vehicle panels, and more specifically, vehicles including mesh stamped panels.

BACKGROUND

Conventional vehicle roof systems generally include a roof panel and a headliner forming a ceiling of the vehicle. Roof panels may include elongated beads to provide increased structural strength. Headliners may include layers of materials such as a foam layer covered with a cloth material. As one example, a headliner may include an inner decorative layer to provide a pleasing visual appearance. In addition, the headliner may include a layer which is intended to absorb sound to reduce noise.

Current roof panels tend to be relatively thick and heavy to meet various structural requirements. Accordingly, a need exists for roof panels that include strengthening features so that thicknesses of the roof panels can be reduced.

SUMMARY

In one embodiment, a vehicle includes a vehicle panel including a plurality of individual mesh structures where the individual mesh structures each include four triangular sides extending outwardly from a plane of the panel forming a pyramid shape. A fillet connects adjacent triangular sides.

In another embodiment, a vehicle panel including a plurality of individual mesh structures where the individual mesh structures each include four triangular sides extending outwardly from a plane of the vehicle panel forming a pyramid shape. A fillet connects adjacent triangular sides.

In another embodiment, a method of forming a vehicle panel is provided. The method includes providing a vehicle panel and stamping a plurality of individual mesh structures where the individual mesh structures each include four triangular sides extending outwardly from a plane of the panel forming a pyramid shape, where a fillet connects adjacent triangular sides.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include one or more mesh stamped panels that can be used at various locations on the vehicles. For example, a vehicle roof assembly may include an exterior mesh stamped panel that can be used as an exterior vehicle roof panel as opposed to conventional roof panels having increased thickness and weight. The meshed stamped panels include repeating patterns of individual mesh structures that each includes a number of their own interconnected features. The individual mesh structures provide the vehicle panels with three-dimensional patterns of the individual mesh structures that can provide the mesh stamped panel with increased strength compared to the original flat panel without the individual mesh structures.

Figure 1:
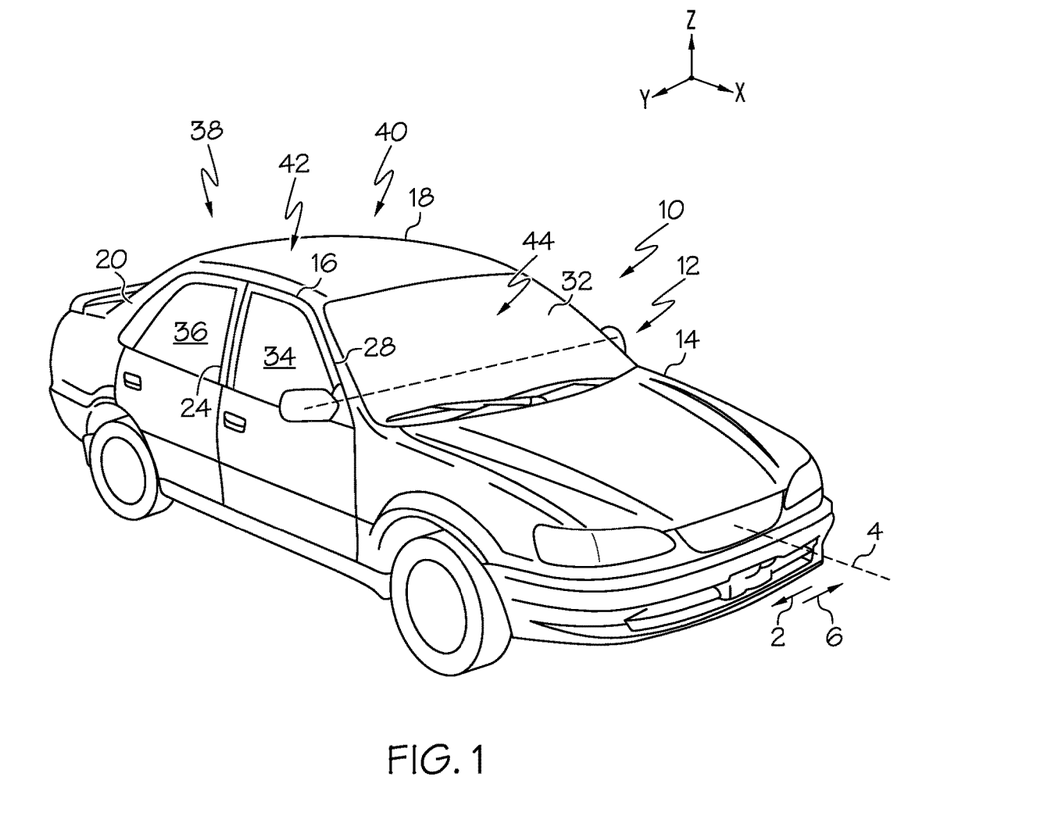
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

The vehicle 10 includes a vehicle body 12 including a body framework 14 that includes a pair of side roof rail structures 16 and 18 and various pillars. The various pillars are connected to the side roof rail structures 16 and 18 and extend downwardly therefrom in a vehicle vertical direction. These pillars are generally referred to as the C-pillars 20, the B-pillars 24 and the A-pillars 28. The A-pillars 28 are located toward the forward end of the vehicle 10, generally between a front windshield 32 and front side windows 34. The B-pillars 24 are located generally between the front and rear side door windows 34 and 36 of the vehicle 10. Finally, the C-pillars 20 are located between the rear side window 36 and rear window 38 of the vehicle. Other pillars, such as D-pillars may be located rearward of the C-pillars 20 (e.g., between rear side windows and rear window).

The vehicle 10 includes a vehicle roof assembly 40 that extends in the vehicle lateral direction between the side roof rail structures 16 and 18 and in the vehicle longitudinal direction between the front windshield 32 and the rear window 38. While only an outer vehicle panel 42 is illustrated, the vehicle roof assembly 40 may be formed of multiple panels, such as an inner vehicle panel that is connected to the outer vehicle panel 42. Further, the vehicle roof assembly 40 may include a headliner that can form an interior panel of the vehicle roof assembly 40 that can be viewed from within a cabin 44 of the vehicle 10. The headliner can also cover at least portions of the remaining vehicle roof assembly 40 from view from within the cabin 44.

Figure 2:
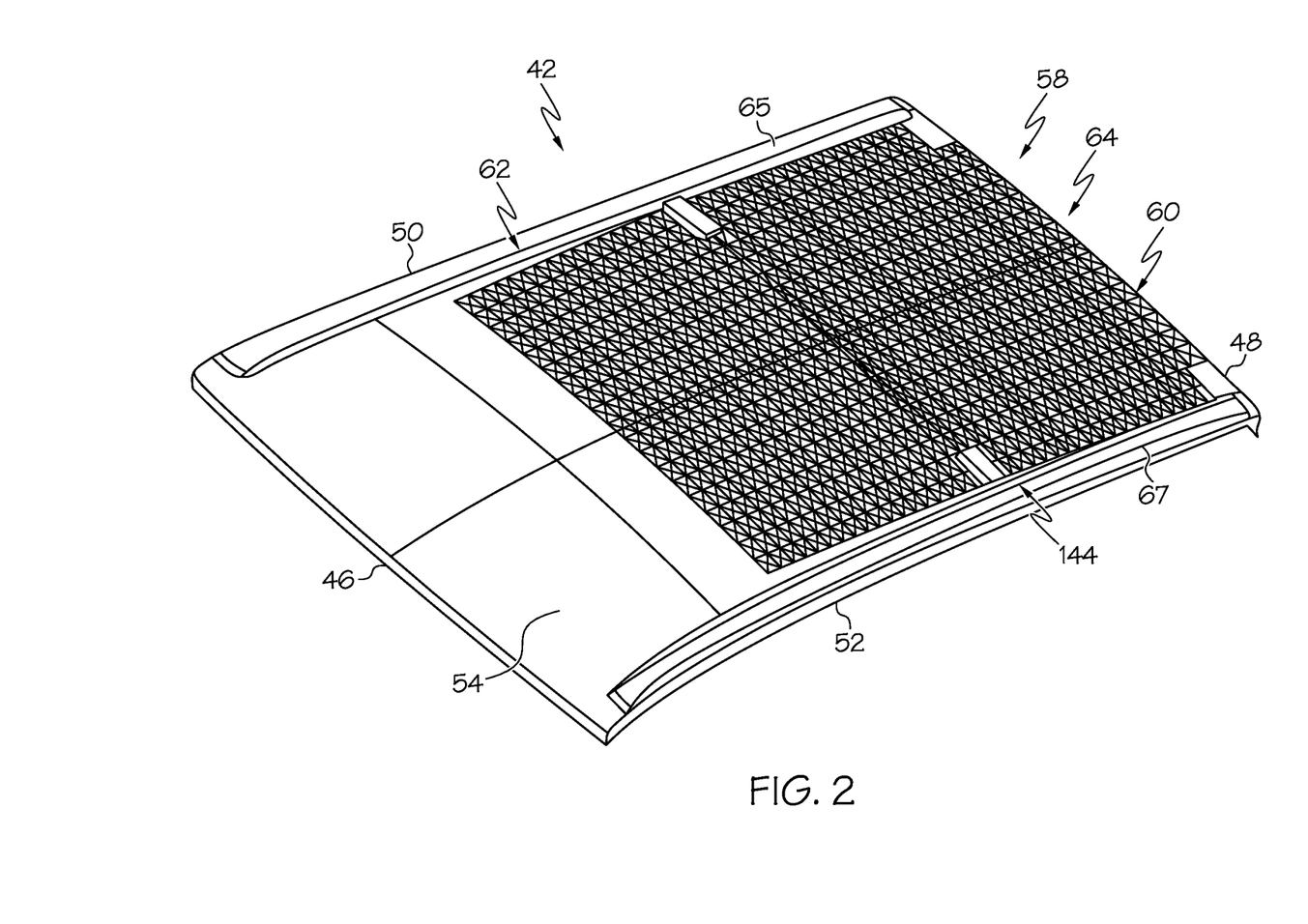
FIG. 2 illustrates a roof vehicle panel of the vehicle of FIG. 1 in isolation, according to one or more embodiments shown and described herein.

Referring to FIG. 2, a more detailed view of the outer vehicle panel 42 is illustrated. The outer vehicle panel 42 includes a front edge 46 that extends generally in the vehicle lateral direction, a rear edge 48 that also extends generally in the vehicle lateral direction, and side edges 50 and 52 that extend generally in the vehicle longitudinal direction between the front edge 46 and the rear edge 48. In some embodiments, the front edge 46 and the rear edge 48 may be generally parallel and the side edges 50 and 52 may be generally parallel forming a rectangular shaped area.

A top surface 54 extends in both the vehicle longitudinal and lateral directions between the front edge 46, rear edge 48 and side edges 50 and 52. Elongated ribs 65 and 67 may extend alongside each of the side edges 50 and 52 in the vehicle longitudinal direction. A field 58 of individual mesh structures 60 extends over the top surface 54 in both the vehicle longitudinal and lateral directions. In some embodiments, the field 58 of individual mesh structures 60 may be arranged in an array of both rows 62 and columns 64. In other embodiments, the individual mesh structures 60 may have a more irregular arrangement.

Figure 3:
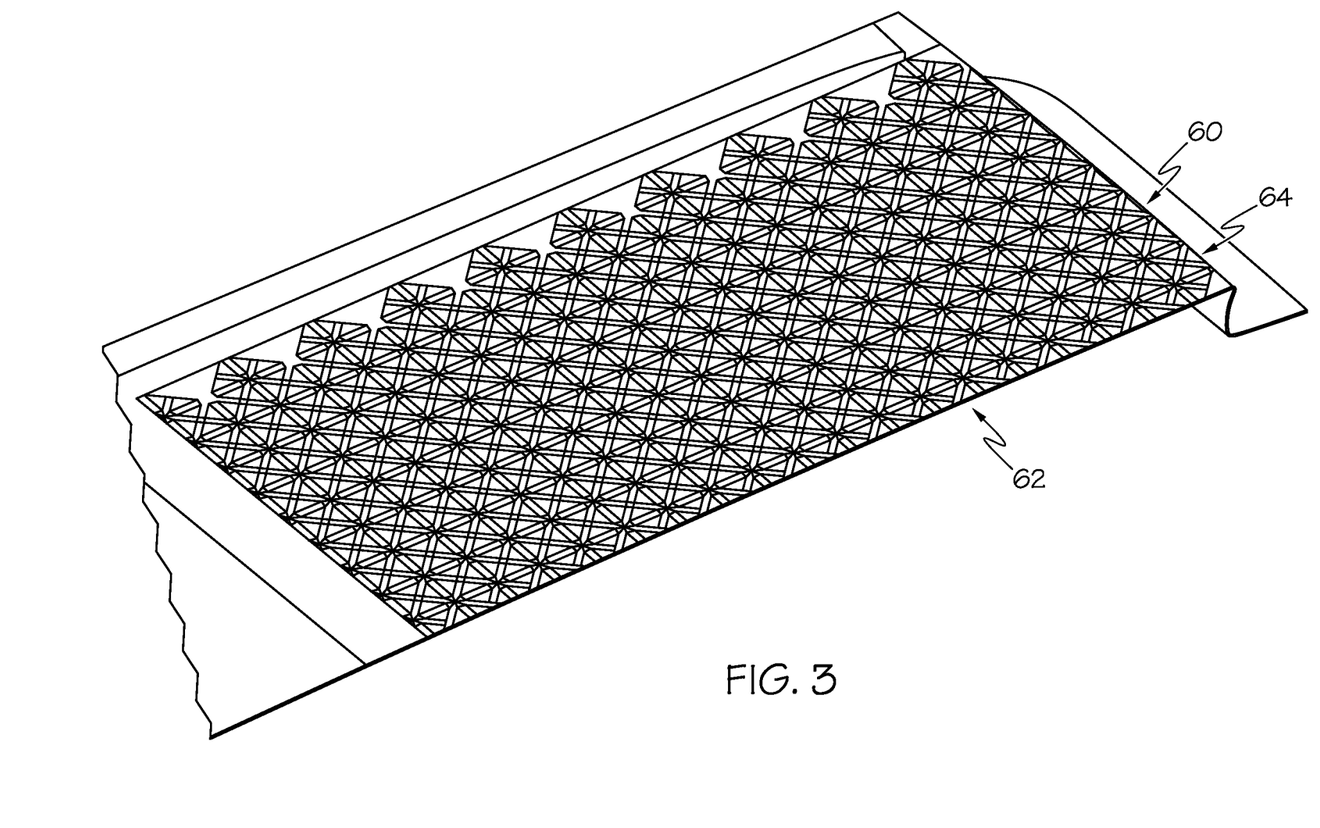
FIG. 3 illustrates an exemplary array of individual mesh structures for the vehicle panel of FIG. 2, according to one or more embodiments shown and described herein.

FIG. 3 illustrates an exemplary array of individual mesh structures 60 that are arranged side-by-side in rows 62 that extend in the vehicle lateral direction and columns 64 that extend in the vehicle longitudinal direction. In the illustrated example, the individual mesh structures 60 are rectangular or square shaped, each overlapping at a border of an adjacent mesh structure 60, as will be described in greater detail below.

Figure 4:
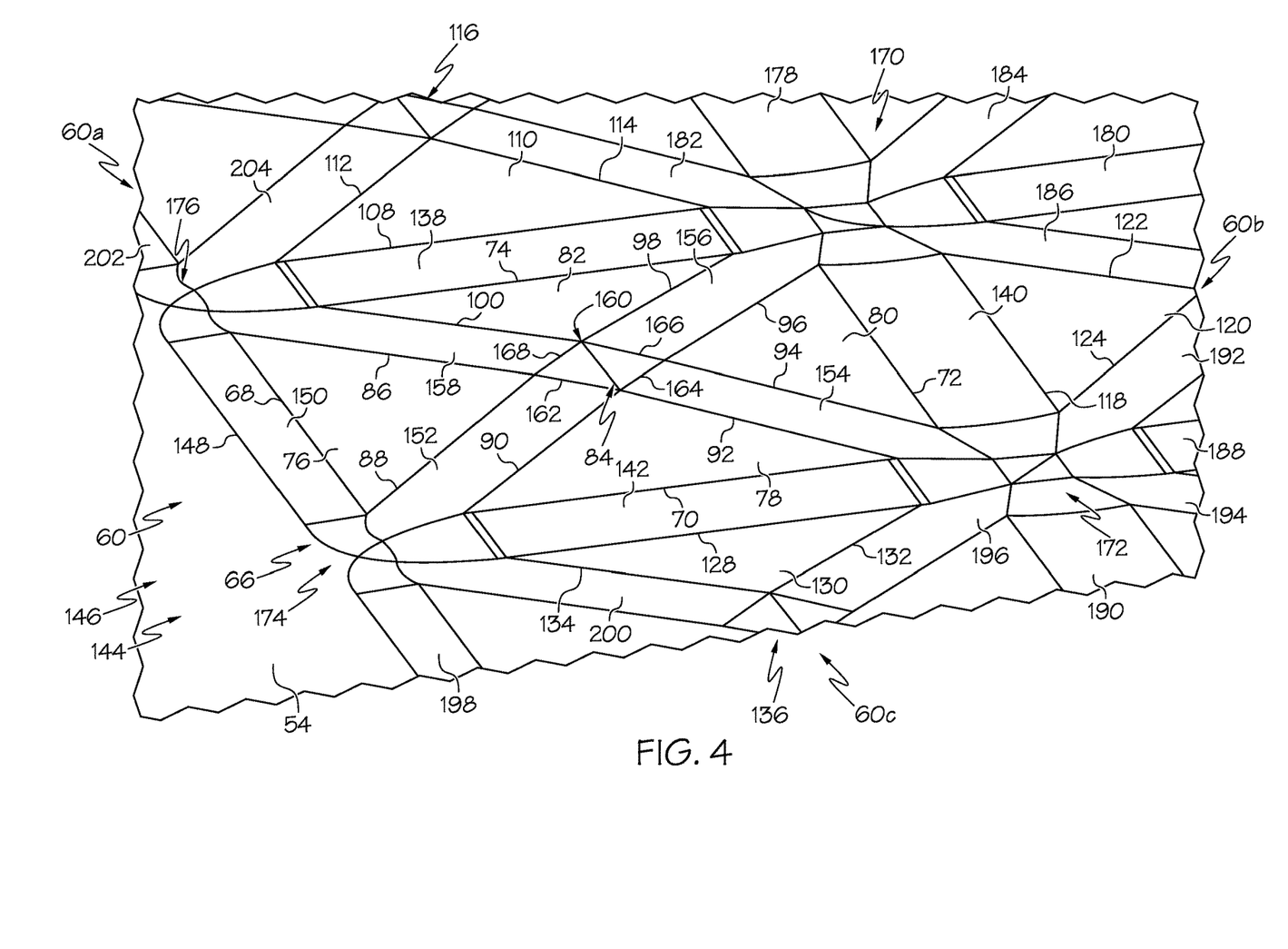
FIG. 4 illustrates a detail view of the vehicle roof panel of FIG. 2, according to one or more embodiments shown and described herein.
Figure 5:
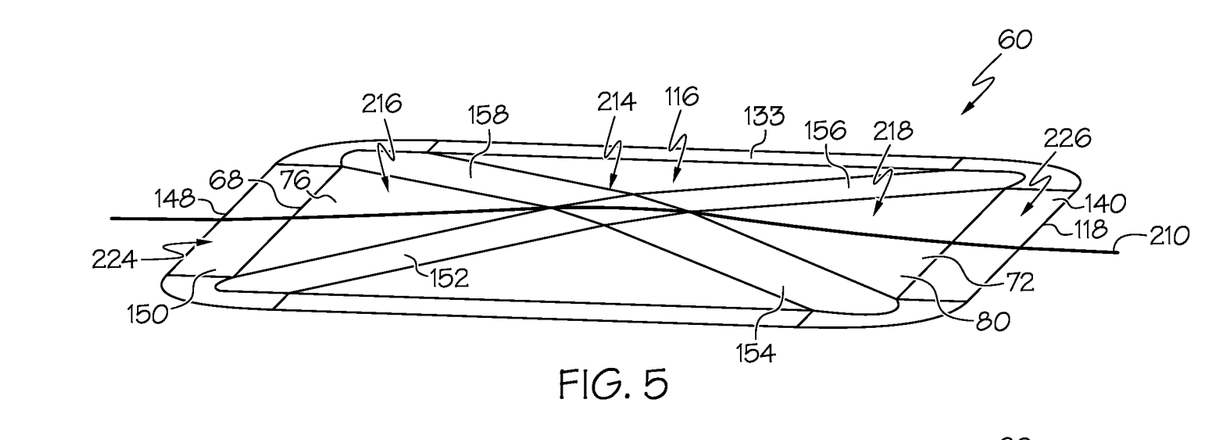
FIG. 5 illustrates an individual mesh structure in isolation, according to one or more embodiments shown and described herein.
Figure 6:
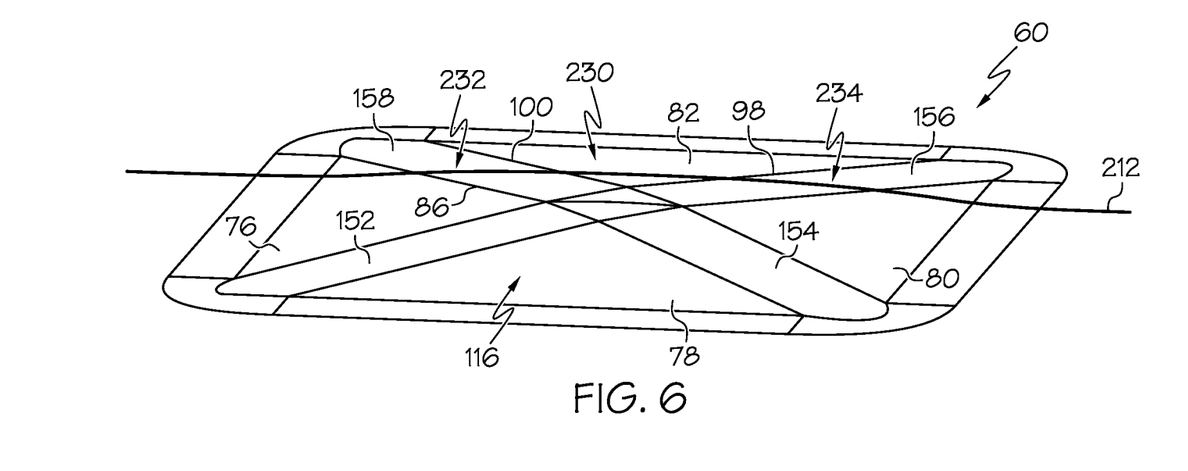
FIG. 6 illustrates the individual mesh structure of FIG. 5 in isolation, according to one or more embodiments shown and described herein.

Referring to FIGS. 4-6, the individual mesh structures 60 are illustrated in greater detail. Referring first to FIG. 4, each individual mesh structure 60 is formed having a rectangular perimeter 66 including opposite lateral edges 68 and 72 and opposite longitudinal edges 70 and 74 that extend between the lateral edges 68 and 72. Each edge 68, 70, 72 and 74 may be formed as a base of an individual triangle 76, 78, 80 and 82 that extends upwardly out of the plane of the top surface 54. In some embodiments, the triangles 76 and 80 are acute and may also be congruent and the triangles 78 and 82 are obtuse and may also be congruent. The triangles 76,78, 80 and 82 may be equilateral and extend upwardly out of the plane of the top surface 54 to an apex region 84 that is located a maximum distance (e.g., between 1 mm and 5 mm, such as 2 mm) out of the plane of the top surface 54.

Referring still to FIG. 4, the triangle 76 includes the edge 68 that forms a base of the triangle 76 and side edges 86 and 88 that extend upwardly from the edge 68 to the apex region 84. The triangle 78 is adjacent the triangle 76 and likewise includes the edge 70 that forms a base of the triangle 78 and side edges 90 and 92 that extend upwardly from the edge 70 to the apex region 84. The triangle 80 is adjacent the triangle 78 and includes the edge 72 that forms the base of the triangle 80 and side edges 94 and 96 that extend upwardly from the edge 72 to the apex region 84. The triangle 82 is adjacent the triangle 80 and includes the edge 74 that forms the base of the triangle 82 and side edges 98 and 100 that extend upwardly from the edge 74 to the apex region 84. Together, the triangles 76, 78, 80 and 82 form a pyramidal shape having the rectangular perimeter 66 and triangular sides that project upwardly to the apex region 84.

Each individual mesh structure 60 is connected to an adjacent individual mesh structure by a fillet. As used herein, the term "fillet" refers to a rounding of an intersection between adjacent structures. In the example of FIG. 4, individual mesh structure 60 is located adjacent individual mesh structures 60a, 60b and 60c. The individual mesh structure 60a is located adjacent the edge 74 that forms the base of the triangle 82, the individual mesh structure 60b is located adjacent the edge 72 that forms the base of the triangle 80, and the individual mesh structure 60c is located adjacent the edge 70 that forms the base of the triangle 76. Like the individual mesh structure 60, the individual mesh structure 60a includes a longitudinal edge 108 that is formed as a base of an individual triangle 110 with side edges 112 and 114 that extend upwardly from the edge 108 to an apex region 116. Further, the individual mesh structure 60b includes a lateral edge 118 that is formed as a base of an individual triangle 120 with side edges 122 and 124 that extend upwardly from the edge 118 to an apex region. The individual mesh structure 60c includes a longitudinal edge 128 that is formed as a base of an individual triangle 130 with side edges 132 and 134 that extend upwardly from the edge 128 to an apex region 136.

Connecting the edges 74 and 108 is an edge fillet 138. The edge fillet 138 is a rounded structure in cross-section (from edge-to-edge) that extends an entire length of the edges 74 and 108. In some embodiments, the edge fillet 138 is bounded by the edges 74 and 108 where the edge fillet 138 transitions into the individual triangles 82 and 110. Connecting the edges 72 and 118 is an edge fillet 140. Again, the edge fillet is a rounded structure in cross-section (from edge-to-edge) that extends an entire length of the edges 72 and 118. The edge fillet 140 may be bounded by the edges 72 and 118 where the edge fillet 140 transitions into the individual triangles 80 and 120. Connecting the edges 70 and 128 is an edge fillet 142. The edge fillet 142 is a rounded structure in cross-section (from edge-to-edge) that extends an entire length of the edges 70 and 128. The edge fillet 142 may be bounded by the edges 70 and 128 where the edge fillet 142 transitions into the individual triangles 78 and 130.

The individual mesh structure 60 (and individual mesh structures 60a and 60c) may be considered an edge mesh structure in that the individual mesh structure 60 forms an edge 144 of the array of individual mesh structures 60 (see also FIG. 2). At the edge 68 that forms the base of the triangle 76, there is no adjacent individual mesh structure. Instead, the individual mesh structure 60 is located adjacent a flat portion 146 of the top surface 54. The flat portion 146 is bounded by an edge 148. An edge fillet 150 connects the edges 68 and 148. The edge fillet 150 is a rounded structure in cross-section (from edge-to-edge) that extends an entire length of the edges 68 and 148. In some embodiments, the edge fillet 150 is bounded by the edges 68 and 148 where the edge fillet 150 transitions into the individual triangle 76 and the flat portion 146 of the top surface 54.

Referring particularly to individual mesh structure 60, each triangle 76, 78, 80, 82 is connected to an adjacent triangle 76, 78, 80, 82 by a side fillet. Connecting the side edge 88 of the triangle 76 and the side edge 90 of the triangle 78 is side fillet 152. The side fillet 152 is a rounded structure in cross-section (from side edge-to-edge) that extends an entire length of the side edges 88 and 90. In some embodiments, the side fillet 152 is bounded by the side edges 88 and 90 where the side fillet 152 transitions into the individual triangles 76 and 78. Connecting the side edge 92 of the triangle 78 and the side edge 94 of the triangle 80 is side fillet 154. The side fillet 154 is a rounded structure in cross-section (from side edge-to-edge) that extends an entire length of the side edges 92 and 94. In some embodiments, the side fillet 154 is bounded by the side edges 92 and 94 where the side fillet 154 transitions into the individual triangles 78 and 80. Connecting the side edge 96 of the triangle 80 and the side edge 98 of the triangle 82 is side fillet 156. The side fillet 156 is a rounded structure in cross-section (from side edge-to-edge) that extends an entire length of the side edges 96 and 98. In some embodiments, the side fillet 156 is bounded by the side edges 96 and 98 where the side fillet 156 transitions into the individual triangles 80 and 82. Connecting the side edge 100 of the triangle 82 and the side edge 86 of the triangle 76 is side fillet 158. The side fillet 158 is a rounded structure in cross-section (from side edge-to-edge) that extends an entire length of the side edges 100 and 86. In some embodiments, the side fillet 158 is bounded by the side edges 100 and 86 where the side fillet 158 transitions into the individual triangles 82 and 76.

The edge fillets and the side fillets meet at fillet junctions. Referring still to individual mesh structure 60, the apex region 116 forms a fillet junction 160 where ends 162, 164, 166, 168 of the side fillets 152, 154, 156 and 158 meet. Corner fillet junctions 170, 172, 174 and 176 are provided at each corner of the individual mesh structure 60 where adjacent individual mesh structures 60 interconnect. At corner fillet junction 170, the edge fillet 138, the edge fillet 140 and the side fillet 156 meet and interconnect. Further, edge fillets 178, 180 and side fillets 182, 184, 186 also meet at the corner fillet junction 170 thereby interconnecting adjacent individual mesh structures 60. At corner fillet junction 172, the edge fillet 140, the edge fillet 142 and the side fillet 154 meet and interconnect. Further, edge fillets 188, 190 and side fillets 192, 194, 196 also meet at the corner fillet junction 172 thereby interconnecting adjacent individual mesh structures 60.

The corner fillet junctions 174 and 176 are located at the edge 144 of the array of individual mesh structures 60. At corner fillet junction 174, the edge fillet 142, the edge fillet 150 and the side fillet 152 meet and interconnect. Further, an edge fillet 198 and a side fillet 200 also meet at the corner fillet junction 174 thereby interconnecting adjacent individual mesh structures 60. At corner fillet junction 176, the edge fillet 150, the edge fillet 138 and the side fillet 158 meet and interconnect. Further, an edge fillet 202 and a side fillet 204 also meet at the corner fillet junction 176.

FIGS. 5 and 6 illustrate the individual mesh structure 60 in isolation with section lines 210 and 212 representing sections through the individual mesh structure 60 at the locations of the section lines 210 and 212. Referring first to FIG. 5, the section line 210 extends through a geometrical center of the individual mesh structure 60, extending through the apex region 116. At the center of the apex region 116, the individual mesh structure 60 is at a maximum height extending out of the plane of the top surface 54. For example, the individual mesh structure 60 may have a maximum height of between about 1 mm and about 5 mm, such as about 2 mm from the original flat planar top surface 54 (FIG. 4).

At the apex region 116, the side fillets 152, 154, 156 and 158 meet at the maximum height, as shown by the section line 210 at area 214. As the section line 210 moves away from the apex region 116, the height of the section line 210 begins to decrease in a linear fashion at regions 216 and 218 as the section line 210 follows along the triangles 76 and 80. The triangles 76 and 80 may be planar, having a constant slope. In other embodiments, the slope of the triangles 76 and 80 may not be constant, for example, the triangles 76 and 80 may have a curved profile extending from the apex region 116 to the edges 68 and 72.

As the section line 210 extends away from the apex region 116, the section line 210 intersects the lateral edges 68 and 72. The section line 210 transitions from a line of relatively constant slope at regions 216 and 218 passing through the triangles 76 and 80 to a curved line at regions 224 and 226 passing through the edge fillets 150 and 140. The section line 210 is curved as the section line 210 passes between edges 68, 148 and 72, 118. The section line 210 may have a radius of curvature within the regions 224 and 226 that is constant or changes as the section line 210 extends through the edge fillets 150 and 140. As can be seen, the curvature of the edge fillets 150 and 140 is concave upward in the vehicle vertical direction or curved into the plane of the top surface 54. This concave curvature is provided for each of the edge fillets 138, 140, 142 and 150, providing a transition between adjacent individual mesh structures 60.

Referring now to FIG. 6, the section line 212 passes through the individual mesh structure 60 at a location that is offset from the apex region 116 in the vehicle lateral direction. In this example, the section line 212 transitions from a line of relatively constant slope passing through the triangle 82 at region 230 to a curved line at regions 232 and 234 passing through the side fillets 156 and 158. The section line 212 is curved as the section line 212 passes between edges 96, 98 and 100, 86. The section line 212 may have a radius of curvature within the regions 232 and 234 that is constant or changes as the section line 212 extends through the side fillets 156 and 158. As can be seen, the curvature of the side fillets 156 and 158 is concave down (convex) in the vehicle vertical direction or curved out of the plane of the top surface 54. This convex curvature is provided for each of the side fillets 152, 154, 156 and 158, providing a transition between adjacent triangles 76, 78, 80 and 82. In the illustrated embodiment, the curvature of the side fillets 152, 154, 156 and 158 is in the opposite direction of the curvature of the edge fillets 138, 140, 142 and 150.

Figure 7:
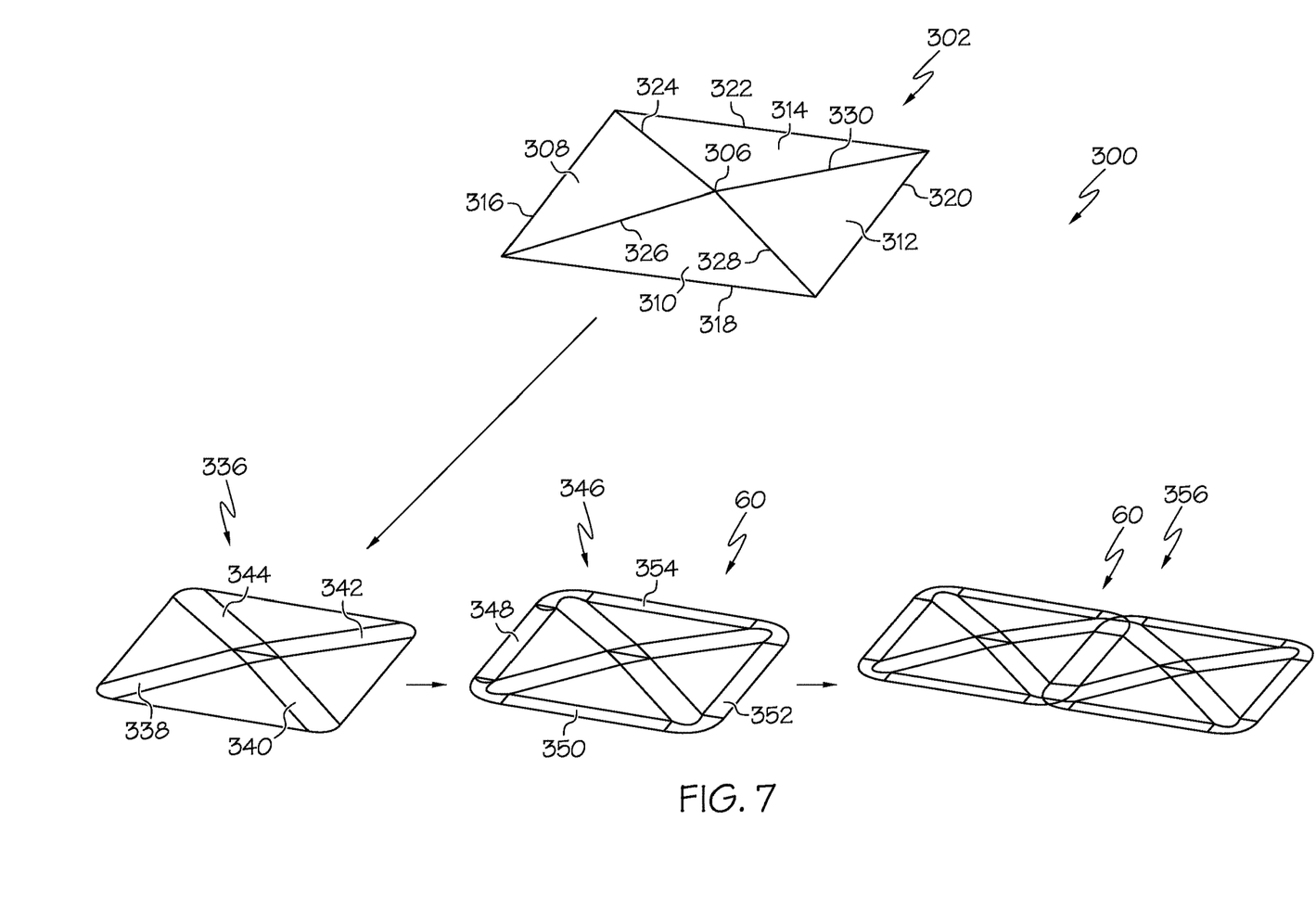
FIG. 7 illustrates a process of making an individual mesh structure for the vehicle panel of FIG. 2, according to one or more embodiments shown and described herein.

Referring to FIG. 7, a process 300 of forming the array of individual mesh structures 60 is illustrated. While FIG. 7 illustrates formation of the individual mesh structure 60 as a series of steps, the individual mesh structures 60 may be formed simultaneously, for example, during a stamping process. At step 302, a basic pyramid shape preform 304 is formed by raising an apex 306 out of a plane of a panel, such as the vehicle panel 42 of FIG. 2. The apex 306 may be formed using equilateral triangular sides 308, 310, 312 and 314 that extend upwardly from edges 316, 318, 320 and 322. In this embodiment, triangular side 308 includes side edges 324 and 326, triangular side 310 includes side edges 326 and 328, triangular side 312 includes side edges 328 and 330, and triangular side 314 includes side edges 330 and 324.

At step 336, side fillets 338, 340, 342 and 344 are formed at the side edges 324, 326, 328 and 330. As described above, the side fillets 338, 340, 342 and 344 are rounded structures in cross-section and convex or concave down in shape forming transitions between the triangular sides 308, 310, 312 and 314. At step 346, edge fillets 348, 350, 352 and 354 are formed at the edges 316, 318, 320 and 322. The edge fillets 348, 350, 352 and 354 are rounded structures in cross-section and concave up in shape forming transitions between adjacent individual mesh structures 60, as shown by step 356.

The above-described array of individual mesh structures for vehicle panels can be provided to reduce sag of the vehicle panels, as well as increase structural rigidity. The array of individual mesh structures may be used instead of linear beads and can also allow for use of thinner vehicle panels (e.g., down to about 0.65 mm), which can increase panel accuracy and reduce a significant amount of material cost for manufacturing the vehicle panels.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle panel comprising a plurality of individual mesh structures where the individual mesh structures each include four triangular sides extending outwardly from a plane of the vehicle panel forming a pyramid shape, where a fillet connects adjacent triangular sides, wherein another fillet connects adjacent individual mesh structures.

2. The vehicle of claim 1, wherein each adjacent individual mesh structure is connected by a respective fillet.

3. The vehicle of claim 1, wherein the another fillet that connects the adjacent individual mesh structures is concave in cross-section.

4. The vehicle of claim 1, wherein each adjacent triangular side is connected by another respective fillet.

5. The vehicle of claim 1, wherein the fillet that connects the adjacent triangular sides is convex in cross-section.

6. The vehicle of claim 1, wherein the triangular sides are equilateral.

7. The vehicle of claim 1, wherein the individual mesh structures comprise a rectangular base.

8. The vehicle of claim 1, wherein the vehicle panel is part of a roof assembly.

9. A vehicle panel comprising a plurality of individual mesh structures where the individual mesh structures each include four triangular sides extending outwardly from a plane of the panel forming a pyramid shape, where a fillet connects adjacent triangular sides, wherein another fillet connects adjacent individual mesh structures.

10. The vehicle panel of claim 9, wherein each adjacent individual mesh structure is connected by another respective fillet.

11. The vehicle panel of claim 9, wherein the another fillet that connects the adjacent individual mesh structures is concave in cross-section.

12. The vehicle panel of claim 9, wherein each adjacent triangular side is connected by a respective fillet.

13. The vehicle panel of claim 9, wherein the fillet that connects the adjacent triangular sides is convex in cross-section.

14. The vehicle panel of claim 9, wherein the triangular sides are equilateral.

15. The vehicle panel of claim 9, wherein the individual mesh structures comprise a rectangular base.

16. A method of forming a vehicle panel, the method comprising:
    providing a vehicle panel;
    stamping a plurality of individual mesh structures where the individual mesh structures each include four triangular sides extending outwardly from a plane of the panel forming a pyramid shape, where a fillet connects adjacent triangular sides; and
    stamping the vehicle panel such that another fillet connects adjacent individual mesh structures.

17. The method of claim 16, wherein each adjacent individual mesh structure is connected by a respective another fillet.

* * * * *